United States Patent
Kang et al.

(10) Patent No.: US 9,915,751 B2
(45) Date of Patent: Mar. 13, 2018

(54) DETECTOR IN A SCATTERED CONFIGURATION APPLIED TO X/GAMMA RAY CONTAINER/VEHICLE INSPECTION EQUIPMENT

(71) Applicants: Nuctech Company Limited, Beijing (CN); TSINGHUA UNIVERSITY, Beijing (CN)

(72) Inventors: Kejun Kang, Beijing (CN); Jianmin Li, Beijing (CN); Yuanjing Li, Beijing (CN); Yulan Li, Beijing (CN); Jingyu Gu, Beijing (CN); Weizhen Wang, Beijing (CN); Quanwei Song, Beijing (CN); Qingjun Zhang, Beijing (CN); Shenjin Ming, Beijing (CN); Xuewu Wang, Beijing (CN); Hui Gong, Beijing (CN); Tao Xue, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 14/769,308

(22) PCT Filed: Jul. 22, 2014

(86) PCT No.: PCT/CN2014/082741
§ 371 (c)(1),
(2) Date: Aug. 20, 2015

(87) PCT Pub. No.: WO2015/014225
PCT Pub. Date: Feb. 5, 2015

(65) Prior Publication Data
US 2016/0231453 A1   Aug. 11, 2016

(30) Foreign Application Priority Data
Jul. 29, 2013   (CN) .......................... 2013 1 0321325

(51) Int. Cl.
*G01V 5/00* (2006.01)

(52) U.S. Cl.
CPC .......... *G01V 5/0016* (2013.01); *G01V 5/0075* (2013.01)

(58) Field of Classification Search
CPC .... G01V 5/0041; G01V 5/005; G01V 5/0016; G01V 5/0075; G01N 23/09; A61B 6/09
See application file for complete search history.

(56) References Cited

U.S. PATENT DOCUMENTS

| | | | | |
|---|---|---|---|---|
| 4,560,877 A | * | 12/1985 | Hoffman | ............... G01T 1/2018 250/366 |
| 5,570,407 A | | 10/1996 | Pesante et al. | |

(Continued)

FOREIGN PATENT DOCUMENTS

| | | |
|---|---|---|
| CN | 101441183 A | 5/2009 |
| CN | 202794067 U | 3/2013 |

(Continued)

OTHER PUBLICATIONS

Russian Office Action dated Oct. 26, 2016 received in Russian Patent Application No. 2015143012, together with an English-language translation.

(Continued)

*Primary Examiner* — David J Makiya
*Assistant Examiner* — Soorena Kefayati
(74) *Attorney, Agent, or Firm* — Scully, Scott, Murphy & Presser, P.C.

(57) ABSTRACT

The present application discloses a detector module, which is arranged on a detector arm, comprising one or a plurality of detector units arranged in a scattered configuration, wherein each of the detector units in the detector module is (Continued)

installed aiming at a beam center of a ray source, thus improving imaging quality and reducing the size of a detector frame drastically.

14 Claims, 4 Drawing Sheets

(56) References Cited

U.S. PATENT DOCUMENTS

| | | | |
|---|---|---|---|
| 5,781,606 A * | 7/1998 | Dobbs | A61B 6/032 378/19 |
| 6,341,156 B1 * | 1/2002 | Baetz | A61B 6/02 378/196 |
| 8,338,788 B2 | 12/2012 | Zilberstein et al. | |
| 2004/0120454 A1 | 6/2004 | Ellenbogen et al. | |
| 2004/0213374 A1 | 10/2004 | Kang et al. | |
| 2008/0298546 A1 * | 12/2008 | Bueno | G01V 5/0016 378/57 |
| 2009/0168971 A1 | 7/2009 | Song et al. | |
| 2011/0103544 A1 | 5/2011 | Hermony | |

FOREIGN PATENT DOCUMENTS

| | | |
|---|---|---|
| CN | 103135121 A | 6/2013 |
| CN | 203519517 U | 4/2014 |
| EP | 2 438 864 A1 | 4/2012 |
| JP | 2-218990 | 8/1990 |
| JP | 2000-505673 A | 5/2000 |
| JP | 2001-017420 A | 1/2001 |
| JP | 2004-184163 A | 7/2004 |
| JP | 2009-128363 A | 6/2009 |
| JP | 2012-81264 A | 4/2012 |
| RU | 2 418 291 C2 | 5/2011 |
| WO | WO 98/04193 A1 | 2/1998 |
| WO | 99/08132 A1 | 2/1999 |

OTHER PUBLICATIONS

Japanese Office Action dated May 9, 2016 received in Japanese Patent Application No. 2015-546844.
International Search Report dated Oct. 27, 2014 issued in PCT/CN2014/082741.
Supplementary European Search Report dated Feb. 13, 2017 received in European Application No. 14 83 1858.

* cited by examiner

DETECTOR IN A SCATTERED CONFIGURATION APPLIED TO X/GAMMA RAY CONTAINER/VEHICLE INSPECTION EQUIPMENT

TECHNICAL FIELD

The present application generally relates to a safety inspection field using X/Gamma ray, and more particularly to a detector arrangement in an X/Gamma ray inspection system.

BACKGROUND

In a field of X/Gamma ray safety inspection, an X/Gamma ray container/vehicle inspection system is usually used, in which a container serves as an object to be inspected. The X/Gamma ray container/vehicle inspection system includes an X/Gamma ray imaging subsystem, a scanning control subsystem, a running inspection subsystem and a radiation safety subsystem. Herein, the X/Gamma ray imaging subsystem as the core of the whole system includes a ray source, a detector and a data acquisition and control module, and is configured to generate X/Gamma ray transmission images. When scanning a container/vehicle to be inspected, the ray source generates high-energy X/Gamma ray pulses penetrating goods to be inspected. The X/Gamma ray is received by a high-sensitivity detector array and converted into output signals, which are processed by the data acquisition and control module to be into a series of digital image signal in real time. Upon completing the whole scanning process, the system automatically generates a complete image of the inspected container/vehicle.

In order to acquire high quality images, the detector is required to be aimed at the direction of the X/Gamma ray source as far as possible. The detector module is consisted of a plurality of detector units arranged side by side. Detectors in the existing X/Gamma ray container/vehicle inspection system are usually arranged in an array configuration as shown in FIG. 1 or in an arc configuration as shown in FIG. 2. However, both of the above configuration manners have obvious disadvantages.

FIG. 1 is a schematic diagram of detectors layout in the array configuration. The array configuration manner may save space and facilitate folding and transporting. However, there exists relatively larger angle differences and gap between respective detector modules, which leads to larger scattering crosstalk among detector units in detector modules. FIG. 2 is a schematic diagram of detectors layout in the arc configuration. In the arc configuration manner, although respective detector units directly face to the direction of beam ray, relatively larger space is occupied, and there is farther distance from the detector to a ray source (e.g., an accelerator, an X-ray machine and a man-made source, etc.), thereby causing a weak signal.

SUMMARY

The present application discloses a new arrangement manner of detectors which employs a scattered configuration, each of the detector units is installed aiming at an X/Gamma ray source, whereby imaging quality is improved and the size of a detector frame is drastically reduced.

According to one aspect of the present application, a detector module is provided, which is arranged on a detector arm, comprising one or a plurality of detector units arranged in a scattered configuration, wherein each of the detector units in the detector module is installed aiming at a beam center of a ray source.

According to another aspect of the present application, the ray source is an X/Gamma ray source.

According to another aspect of the present application, an angle at which each of the detector units is installed is different from each other and related to a height of the corresponding detector unit in the detector arm, so as to ensure each of the detector units to be aimed at the beam center.

According to another aspect of the present application, the detector module is fixed to a detector circuit board on a detector arm, and a shape of the detector circuit board is related to a position of the detector circuit board on the detector arm.

According to another aspect of the present application, the shape of the detector circuit board comprises a rectangle and a parallelogram in which the difference in adjacent interior angles is gradually increased.

According to another aspect of the present application, the rectangular detector circuit board on a detector arm is arranged in the same horizontal plane position as the ray source; and the parallelogram detector circuit board in which the difference in adjacent interior angles is gradually increased is arranged above or below the rectangular detector circuit board on the detector arm, wherein the smaller interior angle of the parallelogram is equal to an included angle between the detector arm and ray beams from a beam center of the ray source.

According to another aspect of the present application, the detector units are fixed to the detector circuit board and connected to a data acquisition and control module via connection terminals, and crystals and diodes of the detector units are coupled with each other by way of end face or side face.

In addition, the present application also provides a method for installing detector modules, wherein each of the detector modules comprises one or a plurality of detector units arranged in a scattered configuration, and the method comprises: installing the detector modules on a detector arm; and aiming each of the detector units in each of the detector modules at a beam center of a ray source.

BRIEF DESCRIPTION OF THE DRAWINGS

For a more complete understanding of the present application, a description of the subsequent specification is made in combination with accompanying drawings, wherein.

DESCRIPTION OF THE EMBODIMENTS

The present application discloses a new arrangement manner of detectors, wherein the arrangement manner employs a scattered configuration, and each of the detector units is installed to be aimed at an X/Gamma ray source, whereby the size of a detector frame may be drastically reduced while improving imaging quality. In order to make the object, the technical solution and advantages of the present application more clear, further description of the technical solution of the present application is made in reference to accompanying drawings and embodiments hereinafter.

Figure 3:
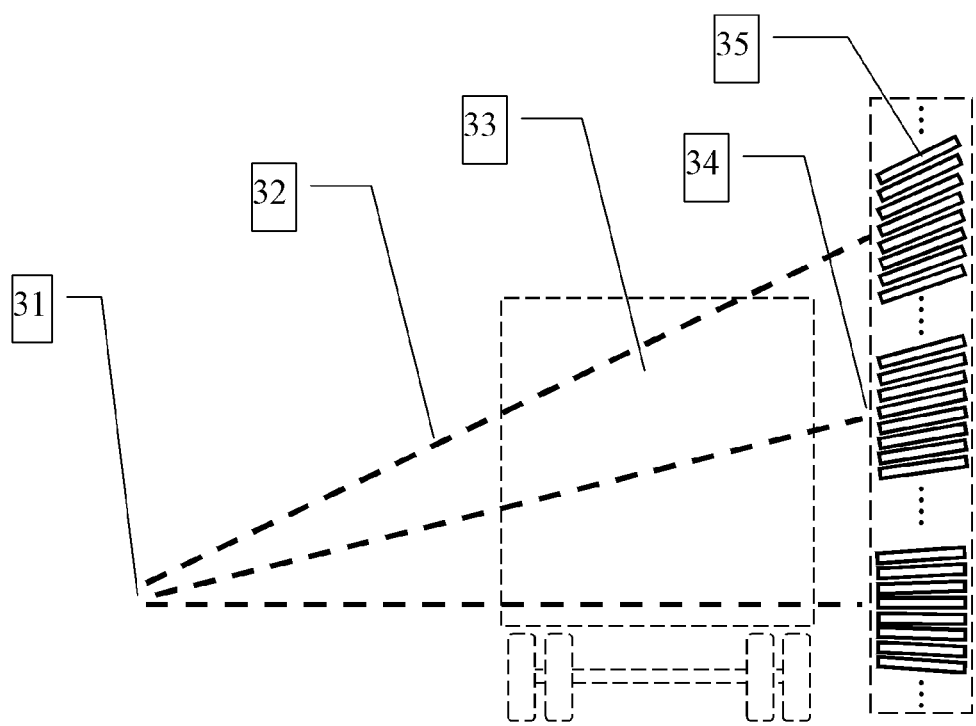
FIG. 3 is a schematic diagram of detectors arranged in a scattered configuration according to the present application.

FIG. 3 is a schematic diagram of detectors arranged in a scattered configuration according to the present application. As shown in FIG. 3, on the basis of the original array configuration of scattered detectors, each detector module is improved so as to ensure that detector units 35 therein are arranged in a scattered configuration and each of the detector units 35 is aimed at an X/Gamma ray source 31. X/Gamma ray beams 32 generated by the ray source 31 penetrates through a vehicle 33 to be inspected and reaches a detector unit 35. An angle at which the detector unit 35 is installed is related to a height of the detector unit. Such an arrangement manner not only integrates advantages of both the array configuration and the arc configuration, but also makes up for their deficiencies.

Referring to FIG. 3, in an embodiment of the present application, a plurality of detector modules are arranged on a vertical detector arm 34. Each of the detector module comprises a plurality of detector units 35 (e.g. 16 paths, 32 paths, 64 paths, etc.) side by side. Each of the detector units 35 in each of the detector modules is aimed at the beam center of the ray source 31 according to the direction of X/Gamma ray beam 34 indicated by dash lines as shown in FIG. 3, and the position (i.e., an angle between the detector unit and the ground) at which the detector unit 35 is arranged on the detector arm 34 is related to the height of the detector unit 35. As shown in FIG. 3, for example, the angle between the ground and a plurality of detector units 35 in the detector module which is closest to the ground is minimal. As the installation position of a detector module rises, the angle between the ground and a plurality of detector units 35 in the detector module is gradually increasing (in the embodiment, it changes from negative angles to zero and then to positive angles) so as to aim at the beam center of the ray source 31. The angle between the ground and a plurality of detector units 35 in the middle detector module is greater than that between the ground and a plurality of detector units 35 in the lower detector module. Moreover, as the installation position of a detector module continuously rises, the angle between the ground and a plurality of detector units 35 in the middle detector module is gradually increasing so as to be aimed at the beam center of the ray source 31. Finally, the angle between the ground and a plurality of detector units 35 in the top detector module which is farthest from the ground is maximal, and the angle between the ground and a plurality of detector units 35 in the upper detector modules is gradually increasing so as to aim at the beam center of the ray source 31. In order to ensure that each of the detector units 35 in each of the detector modules is aimed at the beam center of the ray source 31, the angle between the ground and each of the detector units 35 is adjusted according to the height of each of the detector units 35 on the detector arm 34.

Figure 1:
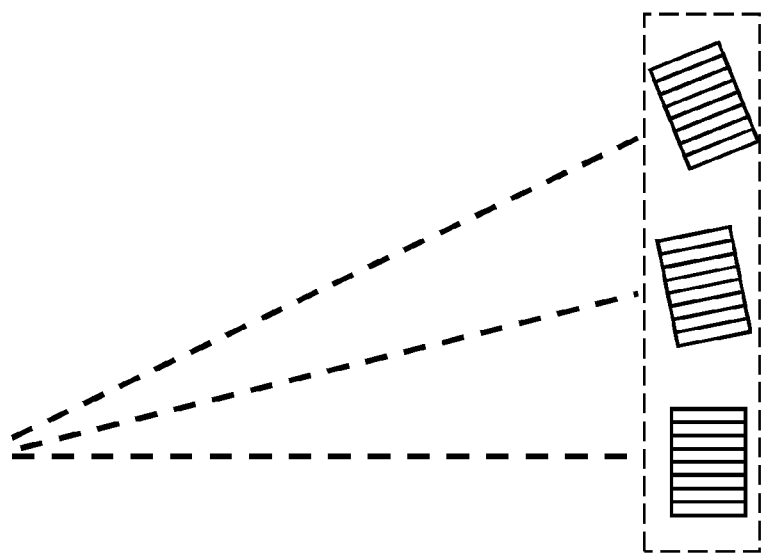
FIG. 1 is a schematic diagram of detectors layout in an array configuration.
Figure 2:
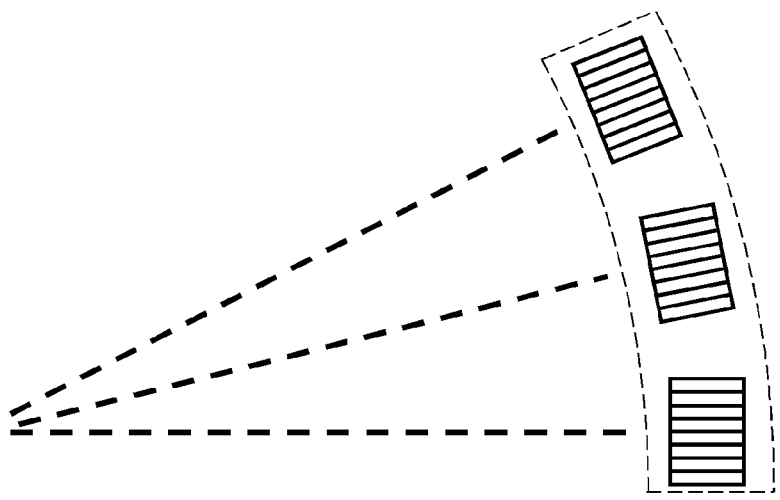
FIG. 2 is a schematic diagram of detectors layout in an arc configuration.

Compared with the arc configuration as shown in FIG. 2, the array configuration as shown in FIG. 3 has the advantages of small crosstalk, strong signal and can save space. Compared with the array configuration as shown in FIG. 1, the arc configuration as shown in FIG. 3 has the advantages of even scattering crosstalk and small noise. In addition, the scattered configuration according to the present application may reduce the thickness of the detector arm 34 at utmost.

Figure 4:
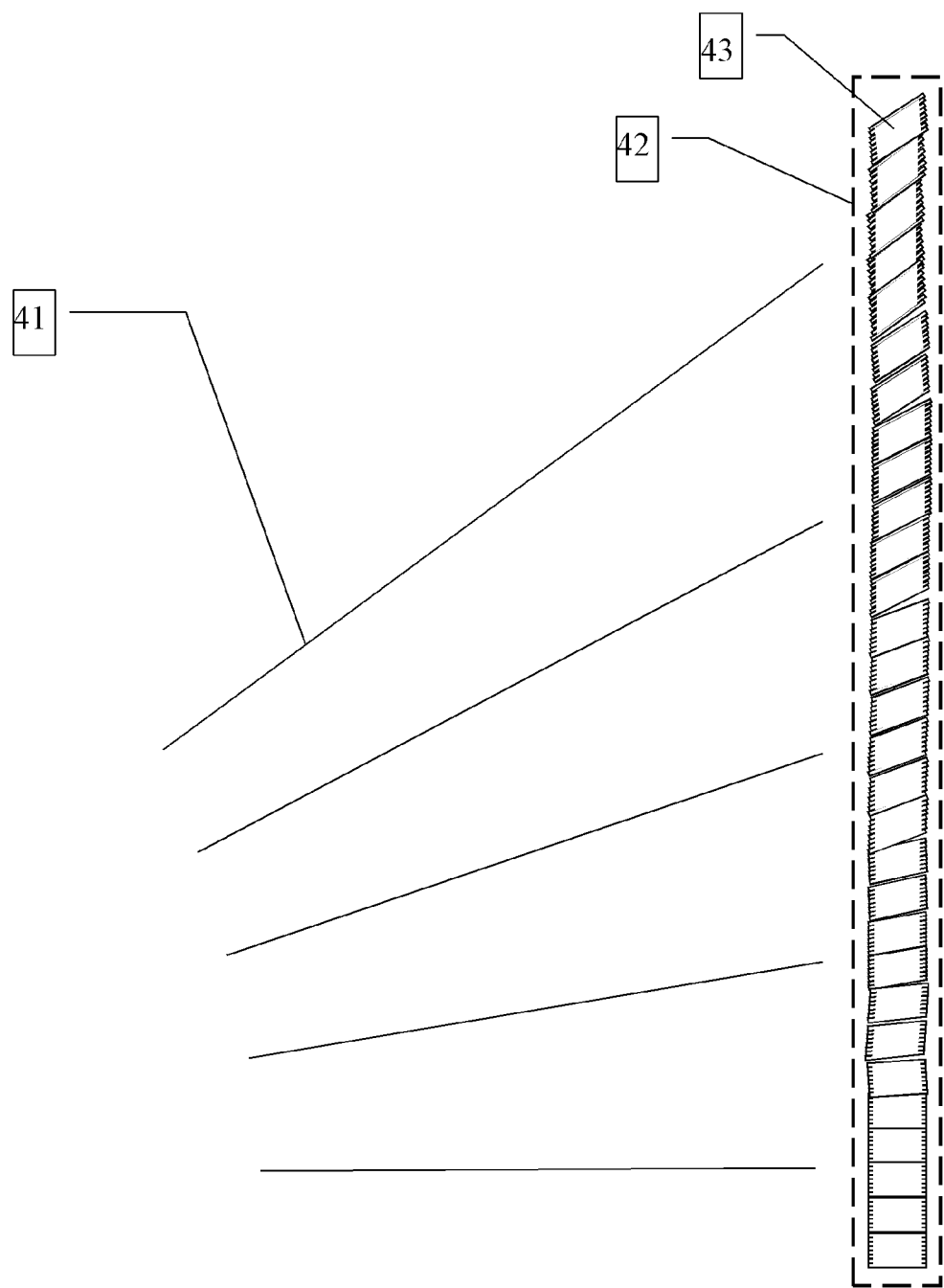
FIG. 4 is a schematic diagram of detector units fixed to an arm frame by circuit boards in a scattered configuration according to the present application.
Figure 5:
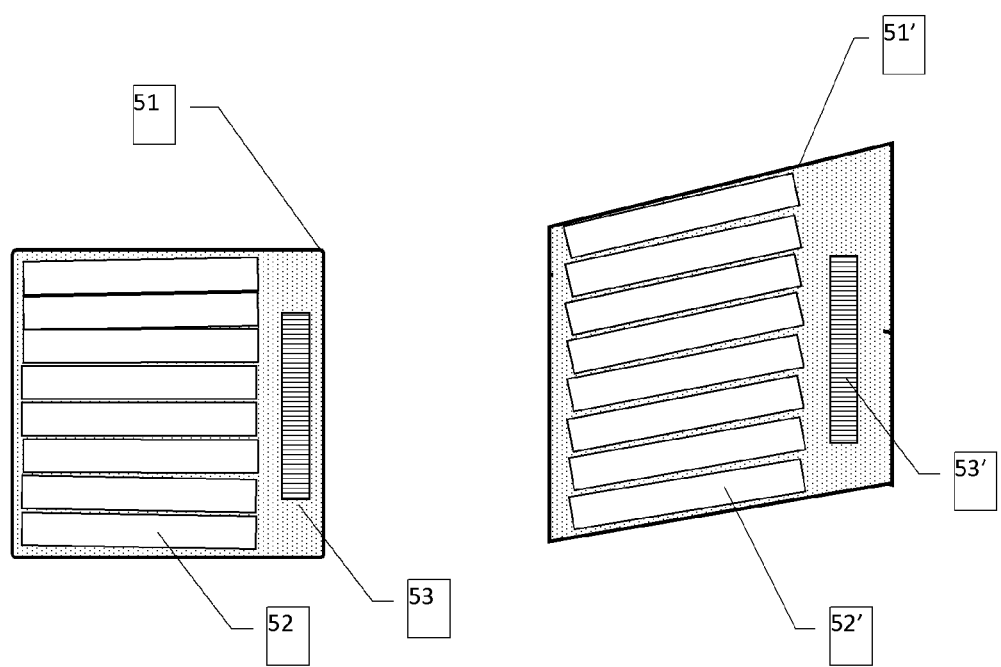
FIG. 5 is a schematic diagram of two typical installation manners of circuit boards according to the present application.

FIG. 4 is a schematic diagram of detector units fixed to an arm frame by circuit boards in a scattered configuration according to the present application. As shown in FIG. 4, in total thirty detector circuit boards 43 are arranged on the detector arm 42. Circuit boards may be numbered before installation, for example, from top to bottom, thirty detector circuit boards may be numbered as circuit board 1, circuit board 2 . . . circuit board 30. The quantity of the circuit boards may be more or less. In another embodiment, the detector circuit boards 43 may also be numbered from bottom to top. A plurality of detector units (e.g. 16-path, 32-path and 64-path, etc.) are arranged on each of the detector circuit board 43, and the angle at which the detector units are arranged on the detector arm 42 is related to the height of the detector units so as to ensure the detector units are aimed at the irradiation direction of the ray beam 41. Moreover, the circuit boards 43 at different positions on the detector arm 42 have different shapes. In the embodiment as shown in FIG. 4, rectangular circuit boards and parallelogram circuit boards are used. As shown in FIG. 4, at a position on the arm frame 42 located in the same horizontal plane as the ray source (not shown in FIG. 4), the arm frame 42 is perpendicular to the ray beam 41, and the circuit boards 43 here are shaped like a rectangle. As the installation position of the circuit boards 43 on the arm frame rises or descends, the included angle between the ray beam 41 and the arm frame 42 deviates from 90°, the circuit boards 43 are shaped like a parallelogram in which the difference in adjacent interior angles is gradually increasing, wherein one of the interior angles is equal to the included angle between the ray beam 41 and the arm frame 42, and is gradually decreasing. FIG. 5 shows both typical circuit boards.

FIG. 5 is a schematic diagram of two typical installation manners of circuit boards according to the present application. The view on the left of FIG. 5 is a schematic view of installation manner of rectangular circuit boards as shown in FIG. 4. The view on the right of FIG. 5 is a schematic view of installation manner of an exemplary parallelogram circuit board of a plurality of parallelogram circuit boards as shown in FIG. 4.

As shown in FIG. 5, a circuit board (including a rectangular circuit board or a parallelogram circuit board) comprises a detector unit 52 or 52' and a connection terminal 53 or 53'. The detector unit 52 or 52' is fixed to a circuit board 1. Crystal and diode (not shown in FIG. 5) of the detector unit 52 or 52' are connected with each other. The detector unit 52 or 52' is connected, via the connection terminal 53 or 53', to an electronic system (not shown in FIG. 5, e.g., a data acquisition and control module) including a front terminal, a sampling holder, a postprocessor, a data memory, a gain controller and a communication device. Particularly, the detector unit 52 or 52' may be either a coupler of a photodetector of a single crystal, or combination of a coupler of a photodetector and a plurality of smaller crystals. The coupled manner of the crystal and the diode may employ arbitrary (e.g., end coupling or side coupling).

In rectangular circuit boards as shown in the view on the left of FIG. 5, a plurality of side-by-side detector units 52 are parallel to the base of the rectangle so that the detector units 52 may be arranged, for example, at such a position on the detector arm with the same height as the ray source as shown in FIG. 4. In the parallelogram circuit boards as shown in the view on the right of FIG. 5, a plurality of side-by-side detector units 52' are parallel to the base of the parallelogram so that the detector units 52' may be arranged, for example, on the top of the detector arm as shown in FIG. 4. As previously explained referring to FIG. 4, the shape of a parallelogram circuit board 1 as shown in the view on the right of FIG. 5 may vary with the installation height of the circuit board 1 on the detector arm. The larger the difference between the installation height of the circuit board on the detector arm and the height of the ray source is, the larger the difference between adjacent interior angles of the parallelogram circuit board is, and the further the shape deviates from the rectangle (e.g., the shape of a rectangular circuit board as shown in the view on the left of FIG. 5). The smaller the difference between the installation height of the circuit board on the detector arm and the height of the ray source is, the smaller the difference between adjacent interior angles of the parallelogram circuit board is, and the nearer the shape is to the rectangle (e.g., the shape of a rectangular circuit board as shown in the view on the left of FIG. 5).

What is disclosed above is merely specific embodiments of the present application. However, the present application is not limited to this. Those skilled in the art may change or modify the present application without departing from the spirit and scope of the present application. Obviously these changes and modifications shall fall within the scope of protection of claims of the present application.

What is claimed is:

1. A detector comprising a plurality of detector modules arranged on a vertical detector arm, each detector module comprising:
   a plurality of detector units arranged in a scattered configuration, wherein each of the detector units of each detector module is arranged to aim at a beam center of a ray source, and
   a detector circuit board, the plurality of detector units arranged on the detector circuit board,
   wherein the shape of each detector circuit board is a parallelogram, and
   wherein a difference in adjacent interior angles of each parallelogram is gradually increased according to a position of each detector circuit board of the plurality of detector modules on the vertical detector arm.

2. The detector of claim 1, wherein the ray source is an X/Gamma-ray source.

3. The detector of claim 1, wherein an angle at which each of the detector units is installed is different from each other and related to a height of the corresponding detector unit in the detector arm, so as to ensure each of the detector units to be aimed at the beam center.

4. The detector of claim 1,
   wherein, when the detector circuit board on the detector arm is arranged in the same horizontal plane position as the ray source, the shape of the detector circuit board is a rectangle; and
   wherein, when the detector circuit board on the detector arm is arranged above or below the same horizontal plane position as the ray source, the detector circuit board is a parallelogram in which the difference in adjacent interior angles is gradually increased, wherein the smaller interior angle of the parallelogram is equal to an included angle between the detector arm and ray beams from a beam center of the ray source.

5. The detector of claim 1, wherein the detector units are fixed to the detector circuit board and connected to a data acquisition and control module via connection terminals, and crystals and diodes of the detector units are coupled with each other by way of end face or side face.

6. A method for installing detector modules, wherein each of the detector modules comprises a plurality of detector units arranged in a scattered configuration, and the method comprises:
   installing the detector modules on a vertical detector arm; and
   aiming each of the detector units in each of the detector modules at a beam center of a ray source,
   wherein each of the detector modules comprises a detector circuit board, on which the respective plurality of detector units are arranged, and
   wherein the shape of each detector circuit board is a parallelogram in which the difference in adjacent interior angles is gradually increased according to a position of the detector circuit board on the detector arm.

7. The method of claim 6, wherein the ray source is an X/Gamma-ray source.

8. The method of claim 6, wherein an angle at which each of the detector units is installed is related to a height of the corresponding detector unit in the detector arm.

9. The method of claim 6,
   wherein the detector circuit board on the detector arm which is arranged in the same horizontal plane position as the ray source is of a rectangular shape, and
   wherein each of the detector circuit boards on the detector arm which is arranged above or below the same horizontal plane position as the ray source is of a parallelogram shape, in which the difference in adjacent interior angles is gradually increased, wherein the smaller interior angle of the parallelogram is equal to an included angle between the detector arm and ray beams from a beam center of the ray source.

10. The method of claim 6, further comprising: fixing the detector units to the detector circuit boards and connecting the detector units to a data acquisition and control module via connection terminals, and coupling crystals of the detector units with diodes thereof by way of end face or side face.

11. A ray detection system, comprising a ray imaging subsystem configured to generate ray transmission images, wherein the ray imaging subsystem comprises:
   a ray source configured to generate ray pulses capable of penetrating a detected object;
   detector modules arranged on a vertical detector arm and each comprising a plurality of detector units arranged in a scattered configuration, wherein each of the detector units in each of the detector module is arranged to aim at the ray source, and the detector modules receive the ray pulses generated from the ray source as being capable of penetrating the detected object and converting the ray pulses into output signals; and
   a data acquisition and control module configured to generate digital image signal in real time according to the output signals,
   wherein each of the detector modules comprises a detector circuit board on which the respective plurality of detector units are arranged,
   wherein the shape of each detector circuit board is a parallelogram in which the difference in adjacent interior angles is gradually increased according to a position of the detector circuit board on the detector arm.

12. The ray detection system of claim 11, wherein an angle at which each of the detector units is installed is related to a height of the corresponding detector unit in the detector arm.

13. The ray detection system of claim 11,
wherein the detector circuit board on the detector arm which is arranged in the same horizontal plane position as the ray source is of a rectangular shape, and
wherein each of the detector circuit boards on the detector arm which is arranged above or below the same horizontal plane position as the ray source is of a parallelogram shape, in which the difference in adjacent interior angles is gradually increased, wherein the smaller interior angle of the parallelogram is equal to an included angle between the detector arm and ray beams from a beam center of the ray source.

14. The ray detection system of claim 11, wherein the detector units are fixed to a detector circuit board and connected to a data acquisition and control module via connection terminals, and crystals and diodes of the detector units are coupled with each other by way of end face or side face.

\* \* \* \* \*